United States Patent [19]
Kobayashi et al.

[11] Patent Number: 4,762,671
[45] Date of Patent: Aug. 9, 1988

[54] INJECTION DEVICE

[75] Inventors: Masahiro Kobayashi, Ebina; Masaru Takahashi, Kawasaki, both of Japan

[73] Assignee: Kabushiki Kaisha Toshiba, Kawasaki, Japan

[21] Appl. No.: 3,224

[22] Filed: Jan. 14, 1987

[30] Foreign Application Priority Data

Jan. 14, 1986 [JP]  Japan .................... 61-5575
Jul. 18, 1986 [JP]  Japan .................. 61-169240

[51] Int. Cl.⁴ ............................................. G21C 19/28
[52] U.S. Cl. ................................. 376/316; 134/113; 134/166 R; 376/248; 376/260
[58] Field of Search ............. 134/113, 166 R, 169 R; 376/248, 260, 308, 309, 316

[56] References Cited

U.S. PATENT DOCUMENTS

| | | | |
|---|---|---|---|
| 4,432,931 | 2/1984 | Lockett | 376/248 |
| 4,470,952 | 9/1984 | Vassalotti | 376/316 |
| 4,496,519 | 1/1985 | McGuire | 376/316 |
| 4,643,867 | 2/1987 | Hornak et al. | 376/248 |
| 4,655,846 | 4/1987 | Scharton et al. | 376/316 |
| 4,668,981 | 5/1987 | Egger | 376/248 |
| 4,676,201 | 6/1987 | Lahoda et al. | 376/316 |

FOREIGN PATENT DOCUMENTS 59-120996  7/1984  Japan .

Primary Examiner—Deborah L. Kyle
Assistant Examiner—Richard Wendtland
Attorney, Agent, or Firm—Oblon, Fisher, Spivak, McCelland & Maier

[57] ABSTRACT

Injection device used when a reactor is shut down to remove radioactive substances from within the gap between the internal piping and the inside of the nozzles of a RPV by injecting fluid towards the inside of these nozzles. The injection device is equipped with an injection nozzle that injects fluid towards the end of the gap, a casing that supports this injection nozzle, a suspension mechanism whereby the casing is movably suspended from above the RPV, a water feed device that supplies high-pressure fluid to the injection nozzle, a sensor or the like that senses when the casing is positioned directly above the internal piping and a fixing mechanism that temporarily fixes the casing to the inside wall of the RPV.

17 Claims, 9 Drawing Sheets

INJECTION DEVICE

BACKGROUND OF THE INVENTION

1. Field of the Invention

This invention relates to an injection device by which high-pressure fluid is injected into relatively inaccessible portions of various vessel nozzles provided on the side walls of a reactor pressure vessel (hereinbelow abbreviated as an RPV).

2. Discussion of Related Art

FIG. 1 shows the construction of a conventional boiling water reactor. In this figure, an RPV 1 accommodates coolant 2 and a core 3. The core 3 is accommodated in a shroud 4, and consists of a plurality of fuel assemblies and control rods (not shown).

The top of the shroud 4 is covered by a shroud head 5 above which are arranged steam separators 6 and steam dryer 7. The annular portion inside the RPV 1 and outside the shroud 4 is termed a downcomer 8.

The reactor output is controlled by using control rod drive mechanisms 9 to adjust the degree of insertion of the control rods into the reactor core 3.

Coolant 2 ascends through the core 3, where it is heated by the nuclear reaction taking place in the core 3. The heated coolant turns into a two-phase fluid consisting of water and steam, and this is fed into the steam separators 6.

The steam separated in the steam separators 6 is fed into the steam dryer 7, where it is dried to form dry steam. This dry steam is fed through main steam pipes 10 connected to the RPV 1 to a turbine system (not shown), to generate electricity. After performing work, the steam is fed to a condenser (not shown), where it is condensed to form condensate. This condensate is returned to the RPV 1 from a feed water nozzle 11, through a feed water system (not shown). Furthermore, the water separated by the steam separators 6 etc. flows down through downcomer 8 and is mixed with the feed water before being fed to the bottom of the core 3 by jet pumps 12.

A plurality of jet pumps 12 are arranged in the downcomer 8 and are equally spaced in the circumferential direction. A recirculation pump (not shown) is provided outside the RPV 1 and the recirculation system piping (not shown) is arranged between this recirculation pump and the jet pumps 12. The coolant is circulated in the core 3 by means of these jet pumps 12, the recirculation pump, and recirculation system piping (not shown). Reference numeral 13 in the drawings refers to recirculation inlet nozzles provided in the RPV 1. Riser pipes 14 of the jet pumps are connected on the inside of these recirculation inlet nozzles 13 through thermal sleeves 15 (FIG. 2). At the top end of the riser pipes 14 are connected branch pipes 16, from which the jet pump drive flow is supplied to the jet pumps 12.

The outer ends of the thermal sleeves 15 are welded to the inside faces of the recirculation inlet nozzles 13. Annular gaps 17 are formed between the outside faces of the thermal sleeves 15 and the inside faces of the recirculation inlet nozzles 13. Over many years of operation of the reactor, radioactive substances collect in these annular gaps 17. There is, therefore, concern that workers will be exposed to this accumulation of radioactive substances when non-destructive inspection is carried out from outside the RPV 1 during periodic inspection of the reactor.

It is therefore desirable to flush this radioactive substance from the gaps 17 prior to inspection. However, the recirculation inlet nozzles 13 are positioned at the lower part of the RPV 1. Because of this, when the reactor is shut down, the operation of washing away this accumulation by removing the RPV cap 18 and flushing with high-pressure water using a pipe lowered from the top of the RPV 1 is very difficult. In particular, this operation is made even more difficult by the fact that, as shown in FIG. 2, riser braces 19 for fixing the riser pipes 14 to the RPV 1 and the brackets 20 for mounting samples for examination of the effect produced by neutron irradiation of materials are mounted in the downcomer 8. Realization of a device to ensure a satisfactory flow of high pressure water for removal of this accumulation of radioactive substances is therefore required.

Coupling of recirculation inlet nozzles 13 and recirculation pipes 190 (shown by a chain-dotted line in FIG. 2) is performed by means of "safe-ends" 20a. Following prolonged operation, stress corrosion cracking may occur at the welds 21 of these safe-ends 20a and recirculation inlet nozzles 13. If such SCC should occur, in the known construction, replacement of safe-ends 20a is extremely difficult. Induction heating stress improvement (hereinbelow abbreviated as IHSI) is therefore carried out to convert the residual stresses in these welds 21 from tensile to compressive stresses. In such IHSI, a coil is wound round the outside of the welds and heating is performed by flowing high frequency electrical current through the coil while feeding cooling water into the annular gaps 17. This produces a temperature difference which gives rise to heat stress between the internal and external surfaces, the heat stress exceeding the yield point and thereby producing compressive residual heat stress at the internal surfaces in the neighborhood of the welds. Thus the introduction of high-pressure water to the inside of the nozzles 13 is required not only to remove the radioactive substances, as already mentioned, but also as cooling water during such induction heating.

The above description has been given with reference to the recirculation inlet nozzles, but the realization of an injection device as described above is also required for jet pump instrumentation nozzles 22 at the lower part of downcomer 8, as shown in FIG. 1.

SUMMARY OF THE INVENTION

The object of this invention is to provide an injection device that is capable of removal, during routine inspection of the reactor, of the accumulation of radioactive substances on the inside of the various vessel nozzles that are provided in the side wall of the reactor pressure vessel, and to create an effective flow of coolant while the operation of induction heating stress improvement is being performed on the vessel nozzles.

According to the invention, the injection device for injecting high-pressure fluid into an arcuate gap between a nozzle and a side wall of a reactor pressure vessel and an internal piping arranged within the nozzle, comprises a casing, means for suspending the casing in the reactor vessel from a position above the reactor vessel whereby the casing can be positioned adjacent to the gap, at least one injection nozzle in the casing, means for supplying high-pressure fluid to the at least one injection nozzle, means for sensing when the at least one injection nozzle is positioned such that high-pressure fluid therefrom may be injected into the gap, and means for selectively fixing the casing to the reactor vessel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9 shows the case where two injection nozzles are arranged such that the angle of the two nozzles to a vertical plane through the center axis of the vessel nozzle is less than 7.5° and water is injected out from both nozzles;

FIG. 10 shows the case where two injection nozzles are arranged such that the angle of the two nozzles to a vertical plane through the center axis of the vessel nozzle is more than 7.5° and water is injected out from both nozzles;

FIG. 11 shows the case where water is injected from only a single injection nozzle;

DESCRIPTION OF THE PREFERRED EMBODIMENTS

Figure 1:
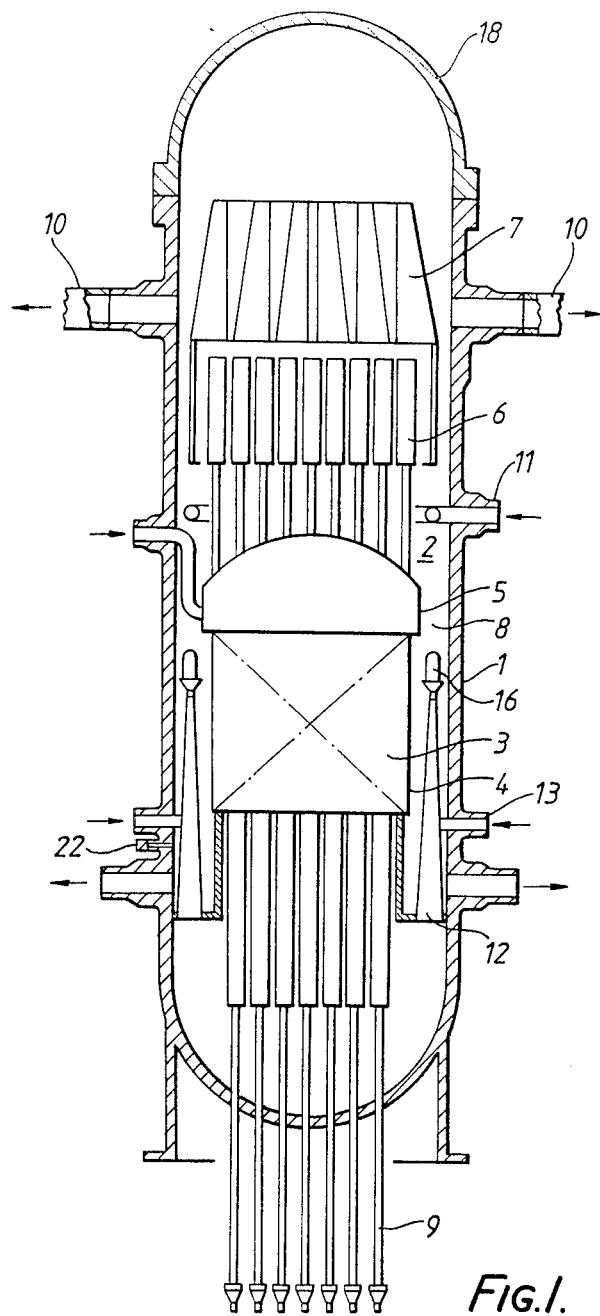
FIG. 1 is an axial cross-sectional view of a conventional boiling water reactor.
Figure 2:
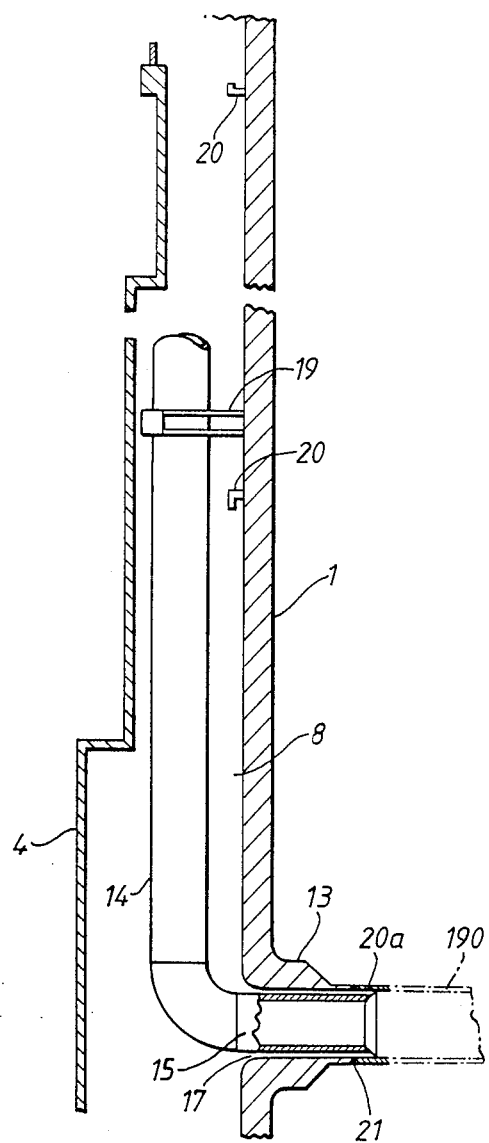
FIG. 2 is a partial cross-sectional view showing a riser pipe and its vicinity.
Figure 3:
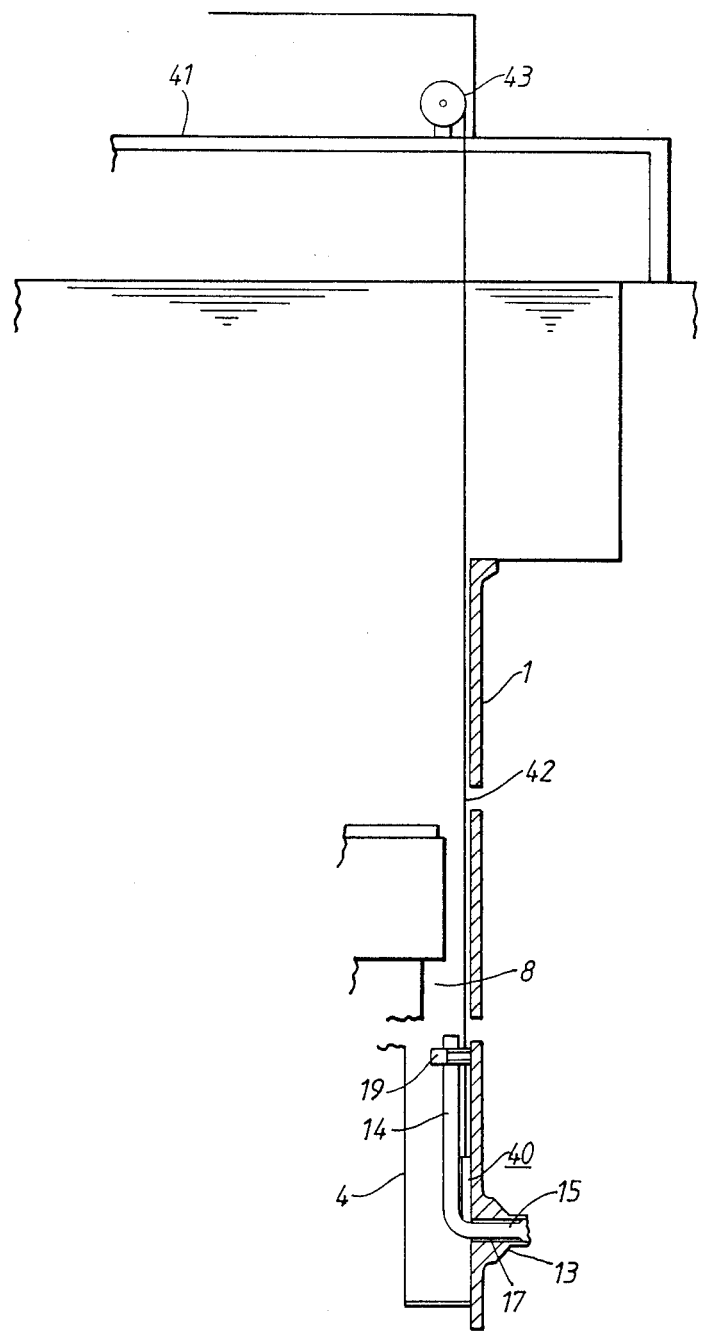
FIG. 3 is a diagram showing the entirety of an embodiment of an injection device according to this invention.
Figure 4:
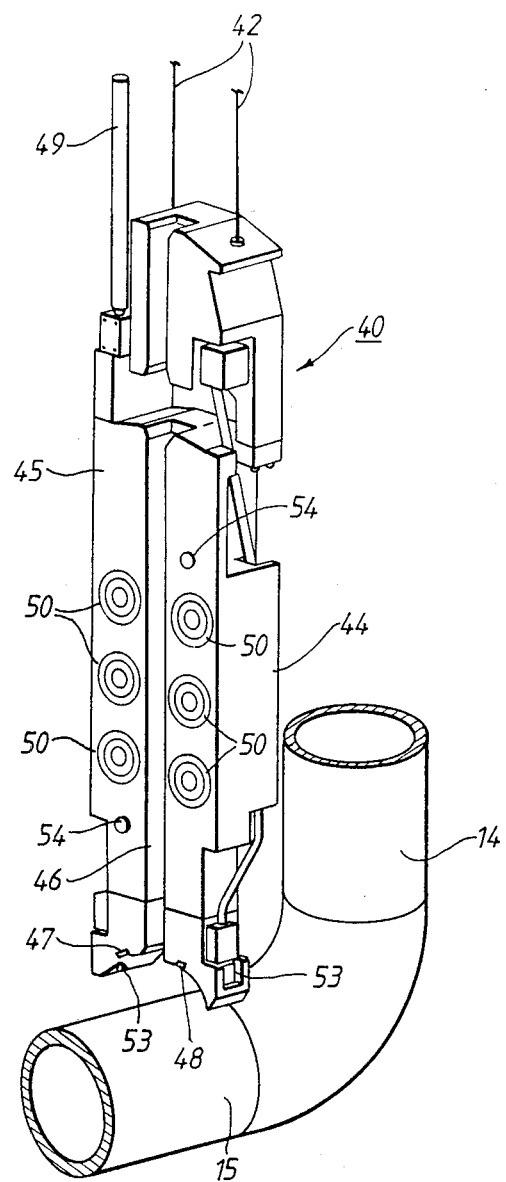
FIG. 4 is a perspective view of the injection device main body of FIG. 3 seen from the RPV side.
Figure 5:
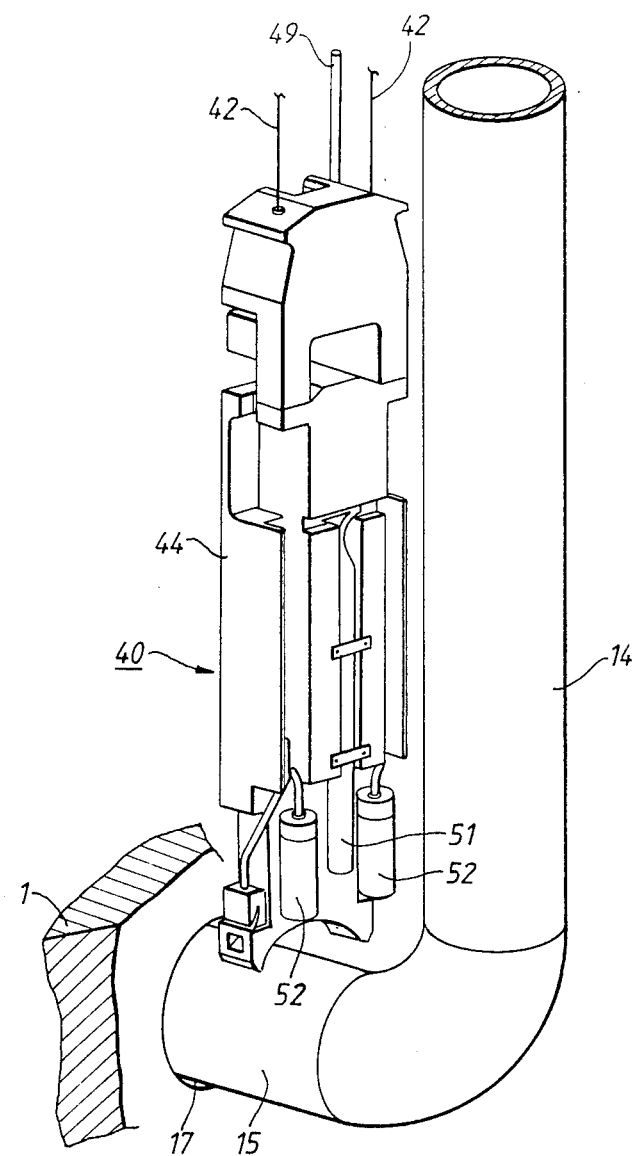
FIG. 5 is a perspective view of the injection device main body of FIG. 2 seen from the shroud side.

An embodiment of the invention will now be described with reference to the drawings. In FIG. 3 an injection device main body 40 is suspended within the downcomer 8 by means of a wire rope 52 that hangs from above a refuelling platform 41 provided above the RPV 1. Reference numeral 43 indicates a suspension mechanism (for example a winch). The injection device main body 40 is constructed as shown in FIG. 4 and FIG. 5. Reference numeral 44 in the drawings indicates a casing. This casing 44 is shaped approximately as a rectangular box, whose face 45 facing the RPV 1 matches the internal shape of the RPV 1 and which has a longitudinal groove 46 formed in the middle thereof and extending over the entire height of the face 45. This groove 46 corresponds in position to a sample mounting bracket 20 that is mounted on the RPV 1. The groove 46 enables the injection device main body 40 to be lowered without interferring with this bracket 20. The bottom end of the casing 44 is arcuate so as to match the shape of the upper surface of thermal sleeve 15. Thus, the injection device main body 40 is automatically positioned by seating on the thermal sleeve 15.

A pair of slit-shaped injection nozzles 47 and 48 are mounted at positions facing each other on the left and right at the bottom end of casing 44. Water is supplied to the injection nozzles 47 and 48 from a water feed pipe 49 arranged within the casing 44 and connected to the injection nozzles 47 and 48. This water feed pipe 49 is connected to a water feed unit, not shown, disposed on the refuelling platform 41.

Figure 6:
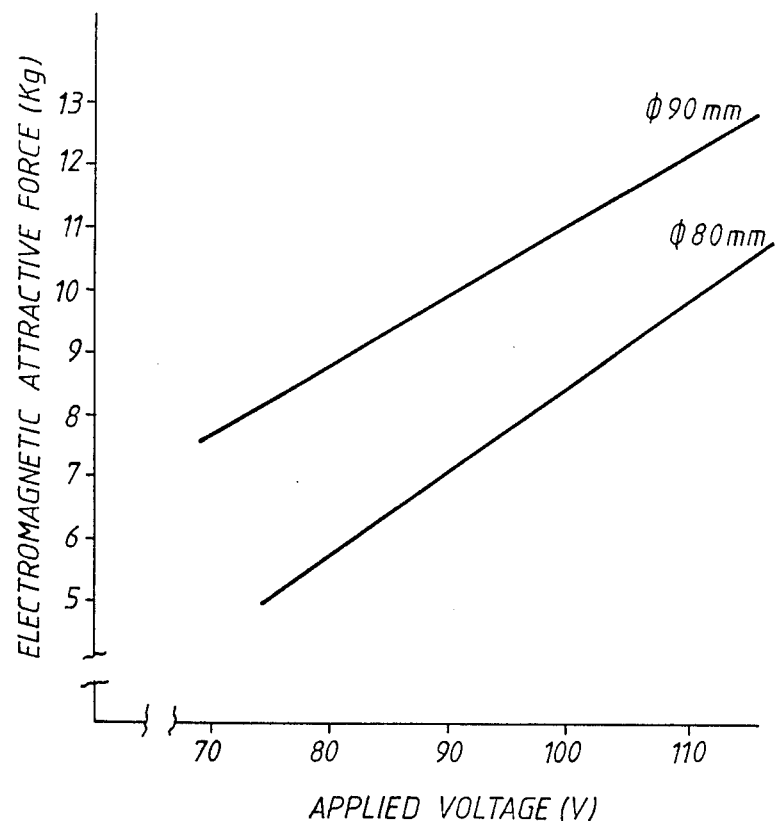
FIG. 6 is a plot showing the relationship between the electromagnetic attractive force and applied voltage to the coils of the electromagnets.

A plurality of electromagnets 50 are mounted on the face 45 of the casing 44 opposite the RPV 1. The inside surface of the RPV 1 is covered with a lining (not shown) of austenitic stainless steel, which is non-magnetic. This lining is normally about 5 mm thick. It has been thought that since this lining is made of non-magnetic steel, it would be impossible to fix any appliances to it by electromagnetic force. However, from the experimental results of FIG. 6, it was found that since the matrix of the RPV 1 is low alloy steel, a sufficient attractive force for the injection device can be obtained. FIG. 6 shows the results of measuring the attractive force of the electromagnets 50 in the case of an austenitic stainless steel lining (thickness 5 mm) and a low alloy steel RPV matrix. The designations "$\phi$90 mm" and "$\phi$80 mm" in the figure indicate the diameter of the respective electromagnetic coils. In this embodiment, the attraction between the injection device main body 40 and the RPV 1, due to the electromagnets 50, is sufficient to withstand the reaction produced when high pressure water is introduced from the injection nozzles 47 and 48.

As shown in FIG. 5, an underwater television camera 51 and underwater lights 52 are arranged on the injection device main body 40. In fact two underwater lights 52 are provided, one on each side of the underwater television camera 51. The relative positions etc. of the injection device main body 40 and thermal sleeve 15 etc. can be observed using the underwater television camera 51 and the underwater lights 52.

As shown in FIG. 4, a pair of touch sensors 53 are mounted at the bottom end of the casing 44. These can be used to ascertain when the injection device main body 40 is seated on the thermal sleeve 15. A further pair of touch sensors 54 are mounted on the surface of the casing 44 facing the RPV 1. These sensors 50 can be used to ascertain when the casing 44 has been attracted onto the RPV 1.

Figure 7:
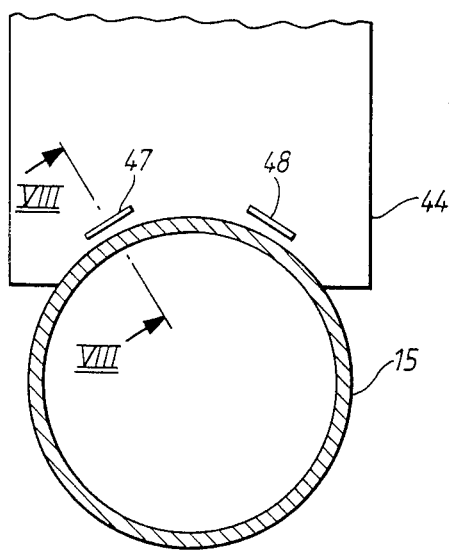
FIG. 7 is a front view of the neighborhood of the injection nozzle of FIG. 4.
Figure 8:
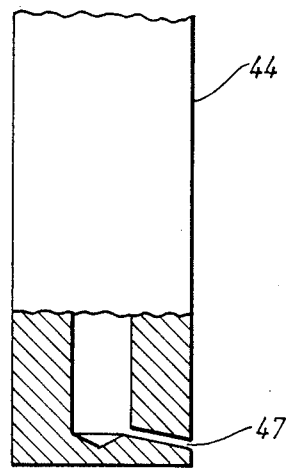
FIG. 8 is a cross-sectional view seen along the direction of arrows VIII—VIII in FIG. 7.

As shown in FIG. 7, the injection outlets of the injection nozzles 47 and 48 are in the form of slits running along the length of the aperture formed by the annular gap 17, which extends around the thermal sleeve 15. Alternatively, the injection outlets may consist of a plurality of circular outlets which are arranged in an arcuate row along the length of the aperture formed by the annular gap 17. As shown in FIG. 8, the injection nozzles 47 and 48 are mounted so as to make a positive radial or dip angle of 0° to 45° with respect to a cylindrical plane concentric with the axis of the inlet nozzle 13 and directed toward this axis.

The mode of operation of the device constructed as above will now be described. First of all, the injection device main body 40 is lowered from refuelling platform 41 using the wire ropes 42 into a position immediately above the recirculation inlet nozzle 13 into which the high-pressure water is to be introduced. Thus the injection device is suspended between the branch pipes 16 of the jet pumps 12 and the RPV 1. Its position is checked using the underwater television camera 51, the underwater lights 52 being switched on for this purpose. If the device is lowered to the location where the bracket 20 is mounted on the RPV 1, it is adjusted so that the groove 46 of the casing 44 is aligned with the bracket 20. Thus the injection device main body 40 is lowered until it is seated on the thermal sleeve 15. Seating of the injection device main body 40 can be ascertained remotely by means of the touch sensors 53. Current is then passed through the electromagnets 50 to cause the injection device main body 40 to be attracted to the RPV 1. This attraction operation is remotely monitored using the touch sensors 54. High-pressure water is then introduced into the annular gap 17 through the injection nozzles 47 and 48, either to remove accumulations of radioactive substances in this annular gap 17, or to effect forced cooling during IHSI.

Figure 9:
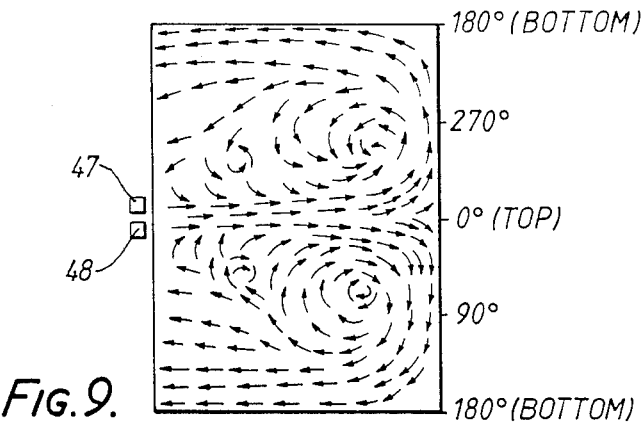
FIG. 9 to FIG. 11 are views showing how the fluid flows in the annular gap in use of the injection device of FIG. 3.
Figure 10:
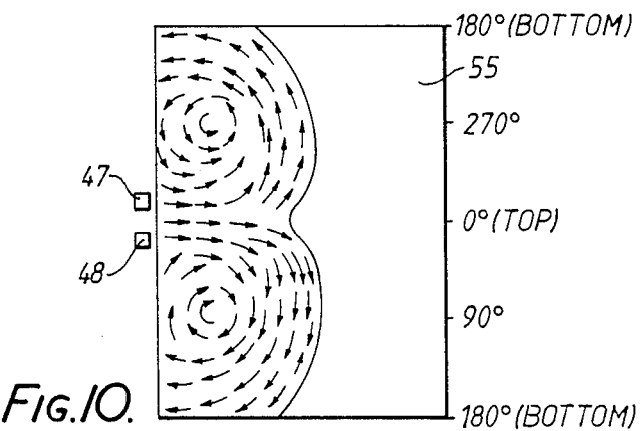
Figure 11:
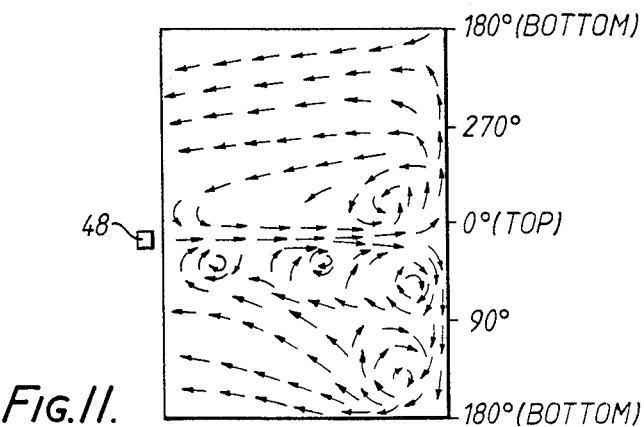

Different flow configurations within the annular gap 17 result from different mounting positions of the injection nozzles 47 and 48 in the circumferential direction of the recirculation inlet nozzle 13, and these will now be explained with reference to FIG. 9 to FIG. 11. These figures were obtained by experimental observation of the flow configuration in the annular gap 17 of thickness 5 mm in a recirculation inlet nozzle 13 of bore 287 mm. FIG. 9 shows the case wherein the mounting positions of two adjacent nozzles 47 and 48 are spaced by not more than 7.5° from a vertical plane passing through the center axis of recirculation nozzle 13 and wherein both the injection nozzles 47 and 48 are operated simultaneously. In this case, the two jet flows have a cooperative guiding effect on each other which causes the jet flow to penetrate to the furthest recesses of the anular gap. Next, FIG. 10 shows the case wherein the mounting positions of the two adjacent nozzles 47 and 48 are separated so as to be spaced by more than 7.5° from a vertical plane through the center axis, both the injection nozzles 47 and 48 being operated simultaneously. In this case, the two jet flows are dispersed in the central region of the annular gap 17 and bounce off each other, so the jet flow energy is lost, and the jet flows do not reach the most interior region of the annular gap 17. This gives rise to a stagnant region 55 in the most interior portion of annular gap 17. With such a nozzle arrangement, it is therefore more effective to operate the injection nozzles one at a time, rather than operating them both simultaneously. That is, if water is injected from only a single injection nozzle 48, the jet flow can then reach the innermost portion of annular gap 17, as shown in FIG. 11.

In the case of cleaning the annular gap 17, since the amount of water delivered by the injection nozzles 47 and 48 can be adjusted remotely, such adjustment can be performed while monitoring the diminution in radiation dosage, and in the case of carrying out IHSI, adjustment can be performed while monitoring the temperature of the recirculation inlet nozzle 13.

The amount of water delivered per injection nozzle is suitably 0.2 m³/h.

Figure 12:
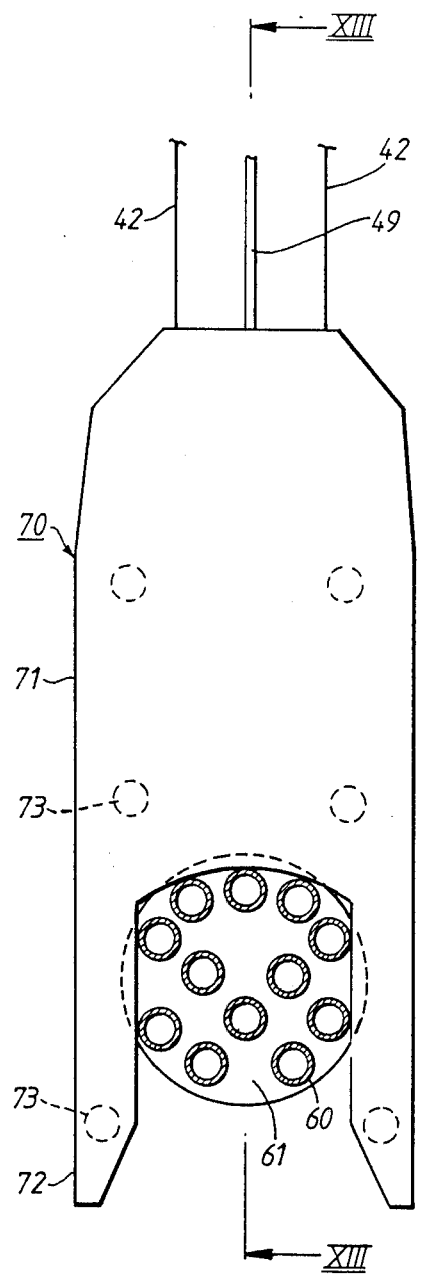
FIG. 12 is a front view showing a second embodiment of an injection device according to this invention.
Figure 13:
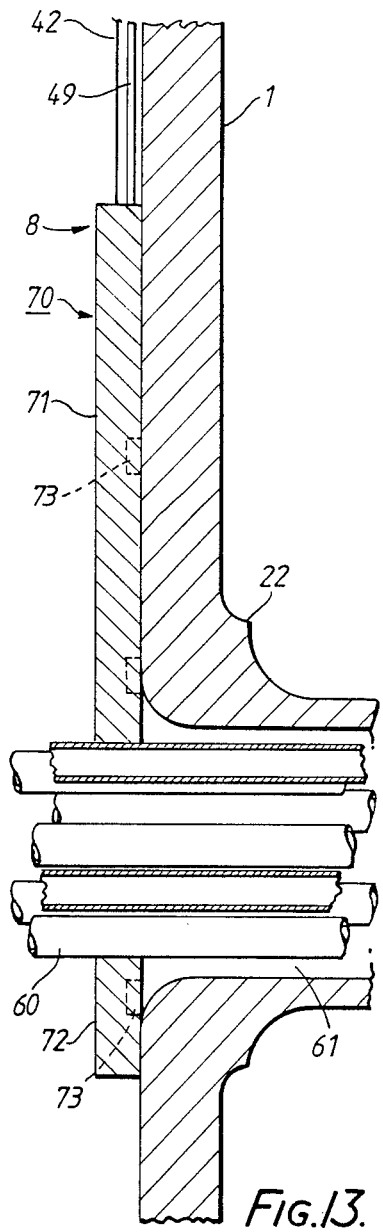
FIG. 13 is a cross-sectional view seen in the direction of the arrows XIII—XIII of FIG. 12.

A device constituting a further embodiment of this invention for introducing high-pressure water onto the inside surface of a jet pump instrumentation nozzle 22 will now be described with reference to FIG. 12 and FIG. 13. Internal instrumentation piping 60 constituted by a plurality of pipes is arranged in the jet pump instrumentation nozzle 22, forming a narrow gap 61 between the piping 60 and the inside of jet pump instrumentation nozzle 22. An injection device main body 70 for introducing water into this gap 61 has practically the same construction and action as the injection device main body 40 of the previous embodiment. However, since the jet pump instrumentation nozzle 22 is smaller than the recirculation inlet nozzle 13, the casing 71 is smaller, and the bottom end of the casing 71 is formed with bifurcated portions 72 which straddle the entire internal piping 60. In this case, since electromagnets 73 can be provided in both bifurcated portions 72, there is the advantage of improved stability of the coupling between the casing 71 and the inside wall of the RPV 1. The construction of the touch sensor and the injection nozzles, etc. (not shown) is the same as in the previous embodiment.

The injection nozzles 47 and 48 can be strings of small circular pores instead of slits.

The following advantages are obtained by the embodiments described above.

(i) Water can be introduced remotely into the interior of the vessel nozzles (the recirculation inlet nozzle 13 and the jet pump instrumentation nozzle 22) that are in not easily accessible positions at the lower part of the RPV 1. Thanks to the fact that the injection device main body 40 or 70 is accommodated in a casing 44 or 71, having a face 44 or 71 opposite the RPV 1 which is of a shape matching the RPV 1 and having the groove 46, and thanks to the fact that operation can be continually monitored using an underwater camera 51, fitting or removal of the device and introduction of high-pressure water can be performed while being able to realiably prevent interference with reactor structures, particularly the bracket 20.

(ii) Since the bottom end of the casing 44 is arcuate and of the same shape as thermal sleeve 15 of the recirculation inlet nozzle 13, or since the bottom end of the casing 71 is bifurcated so that the internal piping 60 of the jet pump instrumentation nozzle 22 can be inserted between the bifurcations, the injection device main body 40 or 70 can be located in position simply by seating the casing 44 or 71 on the thermal sleeve 15 or the internal piping 60. Thus complicated construction or operations for the purpose of locating are entirely unnecessary.

(iii) Thanks to the provision of the touch sensors 53 and 54 on the casing 44, the injection device main body 40 can be monitored using these touch senors 53 and 54, so the device can be operated with ease and in a reliable manner.

(iv) High-pressure water can be effectively introduced into the annular gap 17 or the gap 61 thanks to the fact the injection outlets of the injection nozzles of 47 and 48 of the present embodiment are slit-shaped or shaped as strings of small pores and are symmetrical from left to right and are set at dip angles of 0° to 45°, and thanks to the fact that fluid is injected simultaneously from one or more injection nozzle mounting positions in the circumferential direction of recirculation inlet nozzle 13 or the jet pump instrumentation nozzle 22.

(v) The flow amount of high-pressure water can be set to a value of 0.2 m³/h or more; water can be introduced while monitoring the cleaning effect or the progress of IHSI; and water can be effectively introduced into the annular gap 17 or into narrow and not easily accessible spaces.

(vi) Since fixing of the injection device main body 40 is by means of a simple electromagnet 50 construction, complication of the device and therefore complicated operational procedures can be effectively avoided.

Obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a nuclear reactor pressure vessel having a cylindrical side wall with an interior surface, at least one nozzle penetrating said side wall, piping penetrating said side wall at said nozzle, said nozzle and said piping forming an annular gap at said interior surface of said side wall, and means for decontaminating said reactor pressure vessel at said annular gap, said means for decontaminating comprising:

a casing;

means for suspending said casing in the reactor pressure vessel from a position above the reactor pressure vessel, whereby said casing can be positioned adjacent to the gap;

at least one injection nozzle arranged at a positive dip angle in said casing means for supplying high-pressure liquid to said at least one injection nozzle;

means mounted on said casing for detecting that said at least one injection nozzle is positioned such that high-pressure liquid therefrom may be injected into the gap; and means for selectively fixing said casing to the reactor pressure vessel when said detecting means detects that said at least one injection nozzle is positioned such that high-pressure liquid therefrom may be injected into the gap.

2. Means for decontaminating according to claim 1, wherein said at least one injection nozzle is formed as a slit elongated along said gap.

3. Means for decontaminating according to claim 1, wherein said dip angle is between 0° and 45°.

4. Means for decontaminating according to claim 1, wherein said means for selectively fixing comprises at least one electromagnet fixed to said casing.

5. Means for decontaminating according to claim 1, wherein said means for detecting comprises at least one touch sensor.

6. Means for decontaminating according to claim 1, wherein said casing includes a vertically extending groove extending over the entirety of a surface of said casing, whereby said casing can avoid interferring with an obstacle projecting from the reactor pressure vessel side wall.

7. Means for decontaminating according to claim 1, wherein said means for supplying high-pressure liquid comprises means for supplying at least 0.2 m³/hr of said high-pressure liquid.

8. Means for decomtaminating according to claim 1, wherein said at least one injection nozzle is positioned on said casing so as to be spaced from a vertical plane passing through an axis of the reactor pressure vessel by an arcuate angle of no more than 7.5° when said at least one injection nozzle is positioned such that high-pressure liquid therefrom may be injected into the gap.

9. Means for decontaminating according to claim 1, comprising at least two of said injection nozzles and further comprising means for selectively supplying high pressure liquid to only one of said nozzles at a time.

10. Means for decontaminating according to claim 4, in combination with a reactor pressure vessel having a low alloy steel matrix with a 5 mm thick internal lining of austenitic stainless steel, wherein each said at least one electromagnet has an electromagnetic coil with a diameter of between 80 mm and 90 mm.

11. In a nuclear reactor pressure vessel having a cylindrical side wall with an interior surface, at least one nozzle penetrating said side wall, piping penetrating said side wall at said nozzle, said nozzle and said piping forming an annular gap at said interior surface of said side wall, and means for decontaminating said reactor pressure vessel at said annular gap, said means for decontaminating comprising:

a casting;

means for suspending said casing in the reactor pressure vessel from a position above the reactor pressure vessel, whereby said casing can be positioned adjacent to the gap;

at least one injection nozzle arranged in said casing;

means for supplying high-pressure liquid to said at least one injection nozzle;

means mounted on said casing for detecting that said at least one injection nozzle is positioned such that high-pressure liquid therefrom may be injected into the gap; and means for selectively fixing said casing to the reactor pressure vessel when said detecting means detects that said at least one injection nozzle is positioned such that high-pressure liquid therefrom may be injected into the gap, said fixing means comprising at least one electromagnet fixed to said casing.

12. Means for decontaminating according to claim 11, wherein said at least one injection nozzle is formed as a slit elongated along said gap.

13. Means for decontaminating according to claim 11, wherein said means for detecting comprises at least one touch sensor.

14. Means for decontaminating according to claim 11, wherein said casing includes a vertically extending groove extending over the entirety of a surface of said casing, whereby said casing can avoid interferring with an obstacle projecting from the reactor pressure vessel side wall.

15. In a nuclear reactor pressure vessel having a cylindrical side wall with an interior surface, at least one nozzle penetrating said side wall, piping penetrating said side wall at said nozzle, said nozzle and said piping forming an annular gap at said interior surface of said side wall, and means for decontaminating said nuclear reactor vessel at said annular gap, said means for decontaminating comprising:

a casing;

means for suspending said casing in the reactor vessel from a position above the reactor pressure vessel, whereby said casing can be positioned adjacent to the gap;

at least one injection nozzle arranged in said casing;

means mounted on said casing for supplying high-pressure liquid to said at least one injection nozzle;

means for detecting that said at least one injection nozzle is positioned such that high-pressure liquid therefrom may be injected into the gap, said detecting means comprising at least one tough sensor; and means for selectively fixing said casing to the reactor pressure vessel when said detecting means detect that said at least one injection nozzle is positioned such that high-pressure liquid therefrom may be injected into the gap.

16. Means for decontaminating according to claim 15, wherein said at least one injection nozzle is formed as a slit elongated along said gap.

17. Means for decontaminating according to claim 15, wherein said casing includes a vertically extending groove extending over the entirety of a surface of said casing, whereby said casing can avoid interferring with an obstacle projecting from the reactor pressure vessel side wall.

* * * * *